(12) United States Patent
Faseler et al.

(10) Patent No.: US 12,372,383 B2
(45) Date of Patent: Jul. 29, 2025

(54) ADJUSTABLE INSTRUMENT AND HEATER ATTACHMENT

(71) Applicant: Terrapin Industrial LLC, Houston, TX (US)

(72) Inventors: Brad Faseler, Houston, TX (US); James E. Bundschuh, Fenton, MO (US); Matthew Nance, Boling, TX (US); Daniel Tagtow, Austin, TX (US)

(73) Assignees: Terrapin Industrial, LLC, Houston, TX (US); Brad Faseler, Houston, TX (US)

( * ) Notice: Subject to any disclaimer, the term of this patent is extended or adjusted under 35 U.S.C. 154(b) by 309 days.

(21) Appl. No.: 18/191,606

(22) Filed: Mar. 28, 2023

(65) Prior Publication Data

US 2023/0304833 A1    Sep. 28, 2023

Related U.S. Application Data

(60) Provisional application No. 63/324,265, filed on Mar. 28, 2022.

(51) Int. Cl.
| | | |
|---|---|---|
| *G01D 11/30* | (2006.01) | |
| *F16L 3/10* | (2006.01) | |
| *G01D 11/24* | (2006.01) | |

(52) U.S. Cl.
CPC ............ *G01D 11/30* (2013.01); *F16L 3/1091* (2013.01); *G01D 11/24* (2013.01)

(58) Field of Classification Search
CPC ........ G01D 11/30; G01D 11/24; F16L 3/1091
See application file for complete search history.

(56) References Cited

U.S. PATENT DOCUMENTS 10,712,181 B2    7/2020    Faseler

FOREIGN PATENT DOCUMENTS

WO    WO-2024081903 A1 *    4/2024    ........... G01D 11/245

OTHER PUBLICATIONS

Patel, Valay R. What is Instrument Heated Enclosure or Protection Box? https://instrumentationtools.com/instrument-heated-enclosure/ Instrumentation Tools. Accessed Mar. 27, 2023.

\* cited by examiner

*Primary Examiner* — Jamel E Williams
(74) *Attorney, Agent, or Firm* — ePatentManager; Guerry L. Grune

(57) ABSTRACT

One or more heater elements are enclosed by at least one main heater body assembly surrounded by and attached to heat transfer fins to provide a finned heater body wherein the main heater body assembly includes at least one or more hooked projections wherein the hooked projections are attached to at least one lateral or at least one medial or both lateral and medial sides of a center portion of the main heater body assembly and wherein the finned heater body includes one or more positional openings that allow for containment of the heater element and concurrently provide a spatial geometric arrangement so that the one or more hooked projections provide an ability for the finned heater body and the internal or external housing of one or more instruments to be hung in adjustable manner from a mounting bracket that is attached to a post or pipe stand.

25 Claims, 17 Drawing Sheets

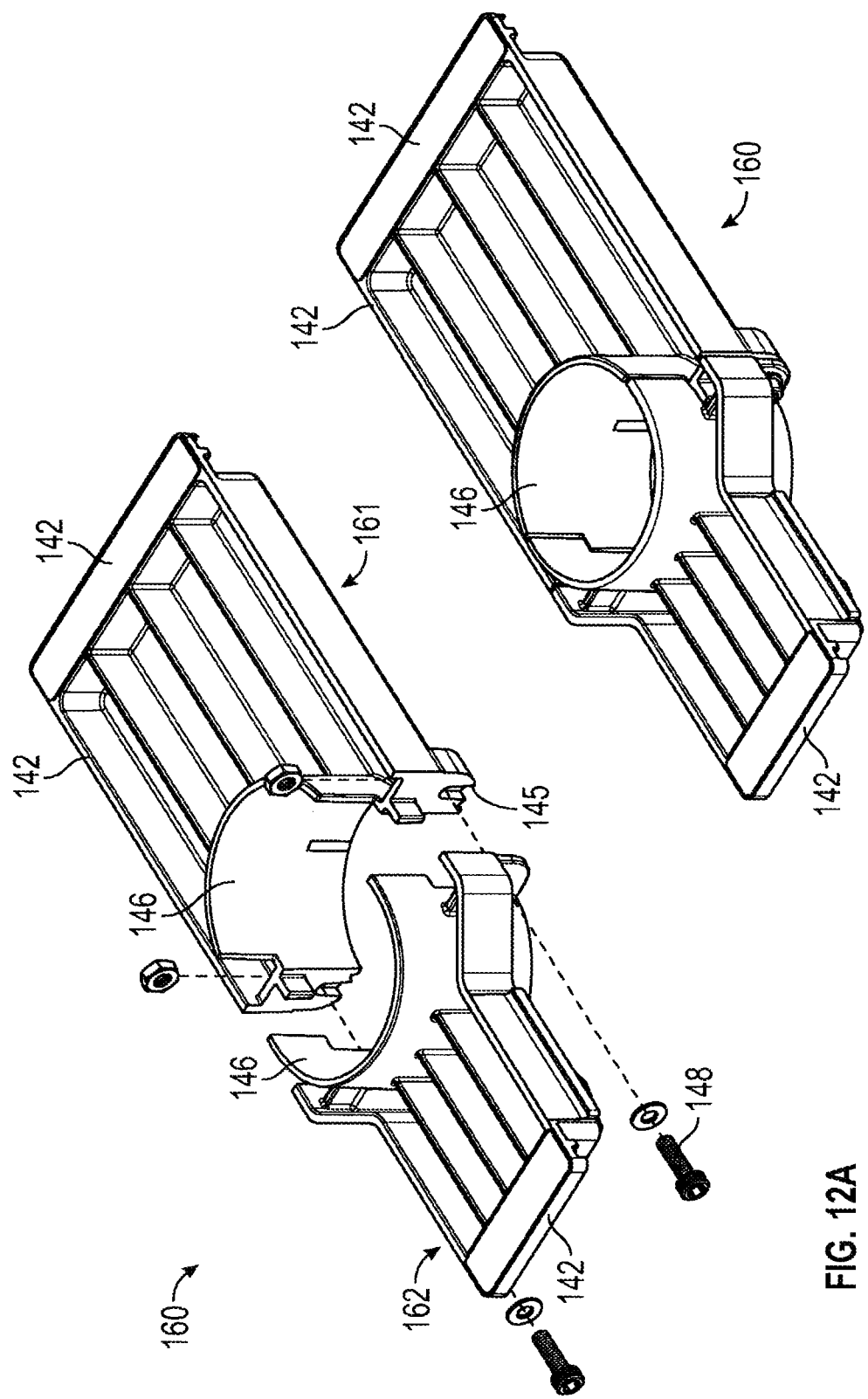

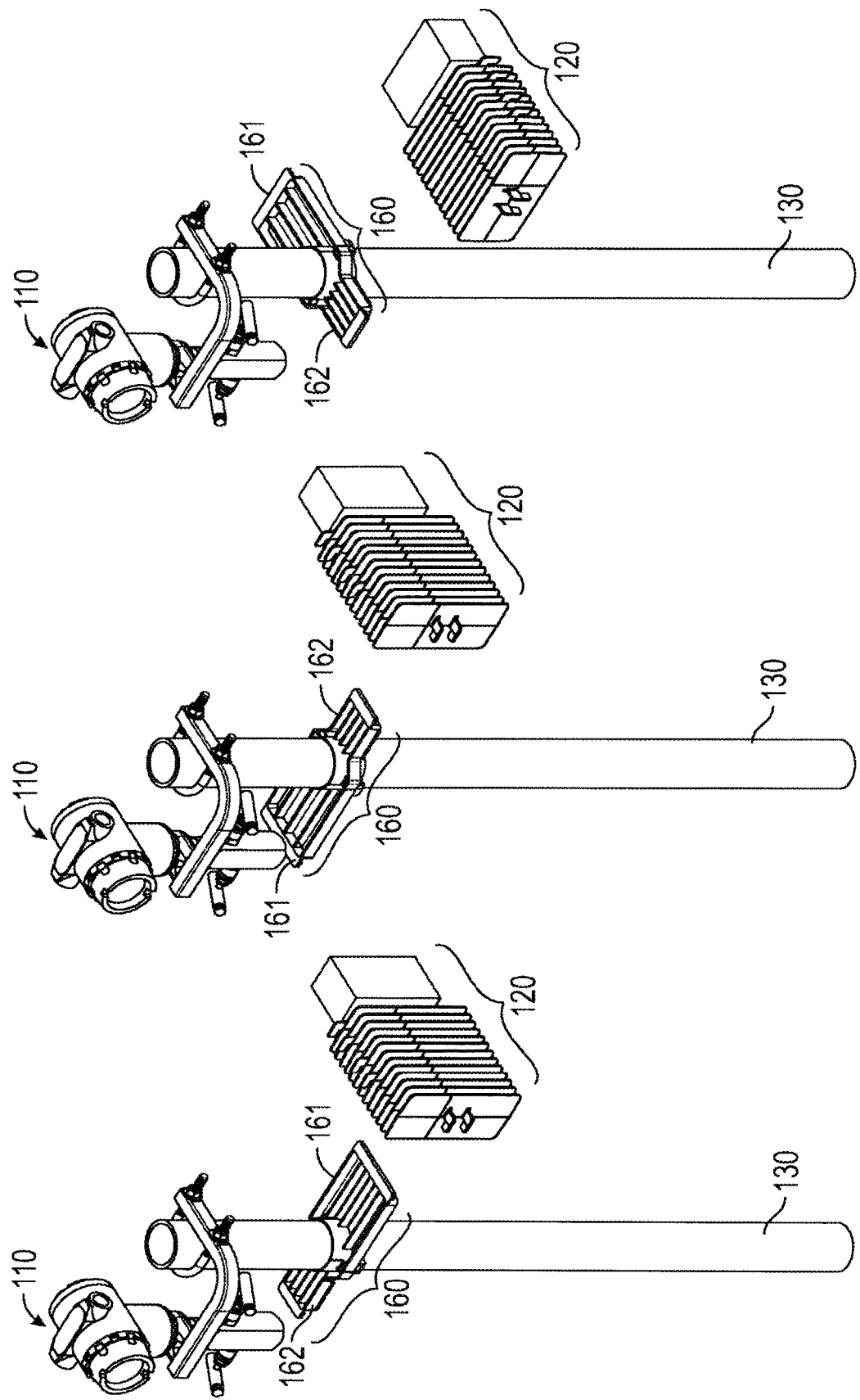

ADJUSTABLE INSTRUMENT AND HEATER ATTACHMENT

PRIORITY

This application is a nonprovisional conversion of and claims priority to U.S. Provisional application 63/324,265 filed Mar. 28, 2022, the entirety of which are incorporated by reference herein. Disclosed subject matter addresses issues associated with rigid box instrument enclosures for heated instruments and extends functionality associated with the retrofittable instrument enclosure disclosed in U.S. patent application Ser. No. 15/928,128, filed Mar. 13, 2018, entitled Instrument Enclosure, and issued on Jul. 14, 2020 as U.S. Pat. No. 10,712,181 B2, referred to hereinafter as "the '181 patent", the entirety of which is incorporated by reference herein.

TECHNICAL FIELD

The present disclosure relates to industrial instrumentation and, more particularly, field-deployed instrumentation installed at a remote location within an environmentally controlled instrumentation enclosure.

BACKGROUND

In various industries including, by way of example, petrochemical, mineral refining, food processing, gas compression, and gas processing, process instrumentation is frequently remote mounted in the field and often times enclosed inside of a box for winterization protection along with a heater to heat the inside of the enclosure containing the process instrument, sometimes for freeze protection, and sometimes at an elevated process temperature to ensure no condensation occurs or to keep the fluid flowing. Currently, heaters are installed in rigid boxes in more critical applications and in very cold climates. Rigid boxes require all of the instrument components to be mounted inside of the hard enclosure, using various brackets. The entire assembly is then mounted to a pipe stand or the like to support the enclosure and instruments inside.

Rigid box enclosures have limitations and drawbacks. Mounting all of the various components inside of the enclosure can, of itself, present significant complexity. In addition, when, as is sometimes the case, when the enclosure needs to be replaced and the heaters and other components have to then be removed from their mounting locations inside of the enclosure. In addition, when the heater needs to be replaced or maintained, it is difficult to remove the heater from such congested spaces as they are bolted down and it becomes extremely difficult to use available field tools to loosen the bolts in order to remove the heater due to interference with or from multiple components inside of the enclosure.

SUMMARY

This disclosure provides, in particular, a disclosed heated instrumentation assembly that employs a disclosed hanging bracket to couple a disclosed heater body to a pipe stand that supports one or more field instruments, referred to herein simply as instruments for the sake of brevity, and/or an instrument enclosure.

The hanging bracket is configured to attach to the pipe stand at any desired position and includes or defines an engageable structure referred to herein as the engagement lip. A disclosed heater body includes a heat fin assembly comprising a plurality of heat fins, one or more of which include one or more integrated hooked projections configured to engage the hanging bracket lip. The integrated hooked projections may be present on two or more sides of the heat fin assembly to enable the heat fin assembly to engage the engagement lip from multiple positions relative to the pipe stand and/or the instruments.

The hanging bracket may be implemented with two or more components configured to engage the pipe stand when affixed to one another with a suitable fastener. In the typical case of a pipe stand having a circular cross section, the hanging bracket may include two semicircular halves that, when attached to one another, can securely engage the pipe stand while also defining an engagement lip that encircles the pipe stand, thereby enabling the heater body to engage the engagement lip anywhere within the 360 degrees of the engagement lip, allowing for flexibility in spacing the heater body, which is highly desirable in view of the potentially large number of instrumentation configurations that the enclosure many include.

The hanging bracket components can be secured to one another with an adjustable pipe clamp or another suitable type of fastener. The hanging bracket assembly may be produced in various sizes to accommodate various pipe stand diameters. If the number of pipe stand diameters frequently encountered is limited to a small number, the number of hanging bracket sizes that might be required could be similarly limited.

More specifically, the present disclosure describes an adjustable enclosure assembly comprising; at least one enclosure portion that provides an internal or external housing of one or more instruments and one or more heater elements that are enclosed by at least one main heater body assembly surrounded by and attached to heat transfer fins to provide a finned heater body wherein said main heater body assembly includes at least one or more hooked projections wherein the hooked projections are shaped in an inverted L-shaped arrangement and wherein the hooked projections are attached to at least one lateral or at least one medial or both lateral and medial sides of a center portion of the main heater body assembly and wherein the finned heater body includes one or more positional openings that allow for containment of the heater element and concurrently provide a spatial geometric arrangement so that the one or more hooked projections provide an ability for the finned heater body and the internal or external housing of one or more instruments to be hung in adjustable manner from a mounting bracket that is attached to a post or pipe stand.

Herein, the mounting bracket attached to the post or pipe stand comprises two semi-circumferential left and right mounting bracket sections that can be mated, wherein each section is contoured to fit around the pipe stand and is secured tightly to the pipe stand.

The pipe stand is provided with an adjustable or non-adjustable pipe stand clamp so that the enclosure assembly and the mounting bracket can be located at an optimal location and/or height along a length of the pipe stand.

The finned heater body is an assembly that also includes hooked projections that extend from a center portion of the finned heater body to provide an ability for the finned heater body to be hung from the mounting bracket by utilization of inverted L-shaped hooked projections.

The two semi-circumferential mounting bracket sections provide a U-shaped body that is contoured in order to provide a geometric fit and attachment to the pipe stand.

In a further embodiment, two semi-circumferential mounting bracket sections are secured to the pipe stand with a tensioning fastener that allows for adjustable pinning and tightening of the two mated semi-circumferential mounting brackets to the pipe stand.

In another embodiment an engagement lip is created that surrounds the U-shaped body so that the finned heater body can be hung anywhere along a 360-degree perimeter of the engagement lip and wherein the engagement lip is completed after the two mated semi-circumferential mounting bracket sections are mated.

Here, the two semi-circumferential mounting bracket sections with the U-shaped body have an inner contour portion on each of two semi-circumferential halves and an outer contour portion located on an outside portion of the U-shaped body, wherein the outer contour portion is located in a position further way from the pipe stand such that an offset from the inner contour portion of the two mated semi-circumferential mounting bracket sections creates at least a portion of the engagement lip to enable the engagement lip to complete a 360-degree circumference around two semi-circumferential mounting bracket sections.

The one or more instruments are also mounted by an attachment to two circumferential instrument mounting brackets with two halves that are shaped with a contour so that the that two circumferential instrument mounting brackets can be mated and attached to the pipe stand via a tensioning fastener.

Both the one or more instruments and the one or more heater elements are mounted either within or external to one or more enclosure portions and wherein one or more heater elements are enclosed by at least one main heater body assembly surrounded by and attached to heat transfer fins to provide a finned heater body and wherein two or more mounting brackets secure both the one or more instruments and one or more heater body assemblies to the pipe stand and wherein attachment to an existing mounting can either be added or removed without dismantling other portions of said field mountable instrument heater.

In another embodiment at least two semi-circumferential left and right mounting bracket sections that can be mated can also be rectangular or in another shape configured to secure the one or more instruments and one or more heater elements to the pipe stand.

Herein, the tensioning fasteners are selected from at least one of a group consisting of clamps, braces, grips, vices, clips, screws and bolts.

In yet an alternative embodiment, a field mountable instrument heater comprising; at least three components that fit together in at least one adjustable configuration, wherein the at least three components include two components that are adjustable to accommodate and attach to a pipe stand or mounting post and wherein a third component is a housing that accommodates both internal and external mounting of one or more heater elements, wherein the heater elements are enclosed and surrounded in a finned heater body assembly and wherein the at least two components that are adjustable to accommodate and attach to the pipe stand are connected to each other and form an engagement lip portion around a perimeter of two connected components so that a third component can be fastened to at least the engagement lip portion and can be removably connected to at least two components connected to each other and wherein attachment to an existing mounting can either be added or removed without dismantling other portions of said field mountable instrument heater.

In addition, herein we describe a method for installing and using an adjustable enclosure assembly comprising; at least one enclosure portion that provides an internal or external housing of one or more instruments and one or more heater elements that are enclosed by at least one main heater body assembly surrounded by and attached to heat transfer fins to provide a finned heater body wherein the main heater body assembly includes at least one or more hooked projections wherein the hooked projections are shaped in an inverted L-shaped arrangement and wherein the hooked projections are attached to at least one lateral or at least one medial or both lateral and medial sides of a center portion of the main heater body assembly and wherein the finned heater body includes one or more positional openings that allow for containment of the heater element and concurrently provide a spatial geometric arrangement so that the one or more hooked projections provide an ability for the finned heater body and the internal or external housing of one or more instruments to be hung in adjustable manner from a mounting bracket that is attached to a post or pipe stand, wherein the method allows for wherein said method allows for removing, adding, installing, and using instruments in a controlled and regulated either heated or unheated environment without requiring any disassembly and/or reassembly of any items along said pole stand.

Again, the mounting bracket attached to the post or pipe stand comprises two semi-circumferential left and right mounting bracket sections that can be mated, wherein each section is contoured to fit around the pipe stand and is secured tightly to the pipe stand.

In addition, the pipe stand is provided with an adjustable or non-adjustable pipe stand clamp so that the enclosure assembly and the mounting bracket can be located at an optimal location and/or height along a length of the pipe stand.

As before, the finned heater body is an assembly that also includes hooked projections that extend from a center portion of the finned heater body to provide an ability for the finned heater body to be hung from the mounting bracket by utilization of inverted L-shaped hooked projections.

As previously described, two semi-circumferential mounting bracket sections provides a U-shaped body that is contoured in order to provide a geometric fit and attachment to the pipe stand.

In yet a further embodiment, two semi-circumferential mounting bracket sections are secured to the pipe stand with a tensioning fastener that allows for adjustable pinning and tightening of the two mated semi-circumferential mounting brackets to the pipe stand.

As described above, an engagement lip is created that surrounds the U-shaped body so that the finned heater body can be hung anywhere along a 360-degree perimeter of the engagement lip and wherein the engagement lip is completed after the two mated semi-circumferential mounting bracket sections are mated.

Here as before, the two semi-circumferential mounting bracket sections with the U-shaped body have an inner contour portion on each of two semi-circumferential halves and an outer contour portion located on an outside portion of the U-shaped body, wherein the outer contour portion is located in a position further way from the pipe stand such that an offset from the inner contour portion of the two mated semi-circumferential mounting bracket sections creates at least a portion of the engagement lip to enable the engagement lip to complete a 360-degree circumference around two semi-circumferential mounting bracket sections.

In addition, these one or more instruments are also mounted by an attachment to two circumferential instrument mounting brackets with two halves that are shaped with a contour so that the that two circumferential instrument mounting brackets can be mated and attached to the pipe stand via a tensioning fastener.

Here, both the one or more instruments and the one or more heater elements are mounted either within or external to one or more enclosure portions and wherein one or more heater elements are enclosed by at least one main heater body assembly surrounded by and attached to heat transfer fins to provide a finned heater body and wherein two or more mounting brackets secure both the one or more instruments and one or more heater body assemblies to the pipe stand.

Herein, at least two semi-circumferential left and right mounting bracket sections that can be mated can also be rectangular or in another shape configured to secure the one or more instruments and one or more heater elements to the pipe stand.

As before, the tensioning fasteners are selected from at least one of a group consisting of clamps, braces, grips, vices, clips, screws and bolts.

In yet another embodiment, the method of installing a field mountable instrument heater comprises; at least three components by fitting together in at least one adjustable configuration, at least two of the components that are adjustable to accommodate and attach to a pipe stand or mounting post and wherein a third component is a housing that accommodates both internal and external mounting of one or more heater elements, wherein the heater elements are enclosed and surrounded in a finned heater body assembly and wherein the at least two components that are adjustable to accommodate and attach to the pipe stand are connected to each other and form an engagement lip portion around a perimeter of two connected components so that a third component can be fastened to at least the engagement lip portion and can be removably connected to at least two components connected to each other.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of exemplary embodiments and advantages thereof may be acquired by referring to the following detailed description and the accompanying drawings, in which like reference numbers indicate like features, and wherein:

FIG. 12A illustrates an exploded perspective view of a rectangular embodiment of a hanging bracket;

FIG. 12B illustrates a perspective view of an assembled rectangular embodiment of a hanging bracket;

FIGS. 14A, 14B, and 14C illustrate the "not close", "close", and "horizontal" positioning of the heater body in relation to the instrument;

DETAILED DESCRIPTION

Figure 1:
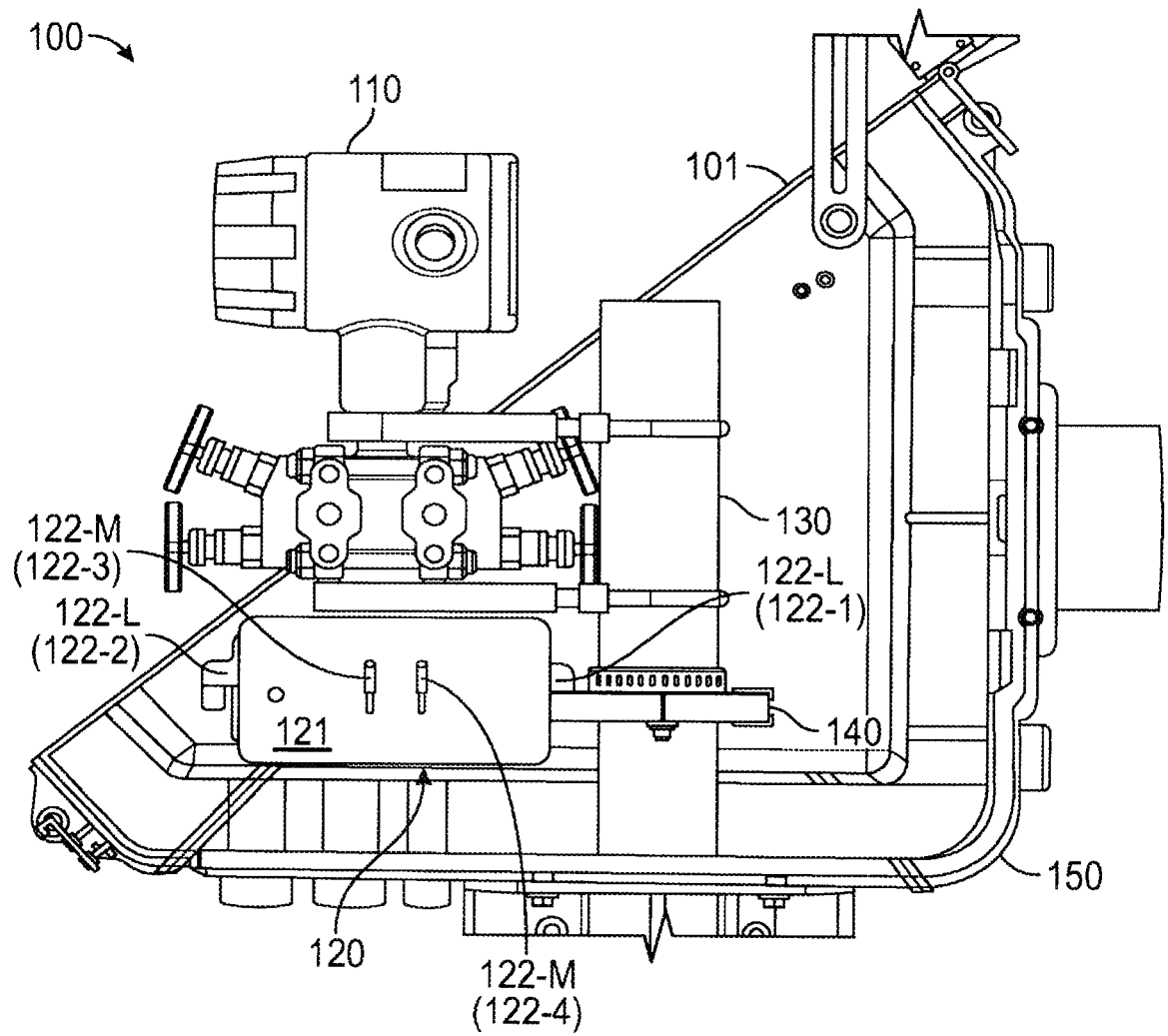
FIG. 1 depicts a side elevation view of a heated instrument enclosure in accordance with disclosed teachings.

In the following description, details are set forth by way of example to facilitate discussion of disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are mechanical communication, including thermal and fluidic communication, as applicable, whether connected indirectly or directly, with or without intervening elements.

FIG. 1 illustrates a heated instrumentation assembly [100] in accordance with teachings disclosed herein. The heated instrumentation assembly [100] depicted in FIG. 1 that includes the instrument enclosure [150] in an open configuration [101] that allows for enclosure of one or more instruments [110] and a heater body [120], both coupled to a pipe stand [130]. The instrument enclosure [150], a portion of which is illustrated in FIG. 1, coupled to a pipe stand [130] that defines the enclosure [150] in which an instrument [110] and heater body [120] reside. In at least some embodiments, instrument enclosure [150] may include one or more features disclosed in the previously referenced '181 patent.

The heater body [120] illustrated in FIG. 1 includes one or more heat fins [121] and acts as a heat sink. At least one of the heat fins [121] includes one or more hooked projections [122], four of which are illustrated in FIG. 1. The hooked projections [122-L] illustrated in FIG. 1 include first and second laterally oriented hooked projections ([122-1] and [122-2]), while the hooked projections [122-M] include two medially oriented hooked projections ([122-3] and [122-4]). As depicted in FIG. 1, hooked projection 122-1 (along with [122-1*], not shown) engages a hanging bracket [140] affixed or otherwise secured to pipe stand [130] while hooked projections [122-2], [122-2*] (not shown), [122-3], and [122-4] are not engaged with other structures. In other configurations, not depicted in FIG. 1, heater body [120] might be repositioned such that a different hooked projection, e.g., hooked projections [122-2], [122-2*] (not shown), [122-3], and/or [122-4] engage the hanging bracket [140]. Similarly, while FIG. 1 illustrates hooked projection [122-1] engaging a particular part of the hanging bracket [140], the heater body [120] might be repositioned such that hooked projection [122-1] engages hanging bracket [140] at a different position than the one shown in FIG. 1.

Figure 2A:
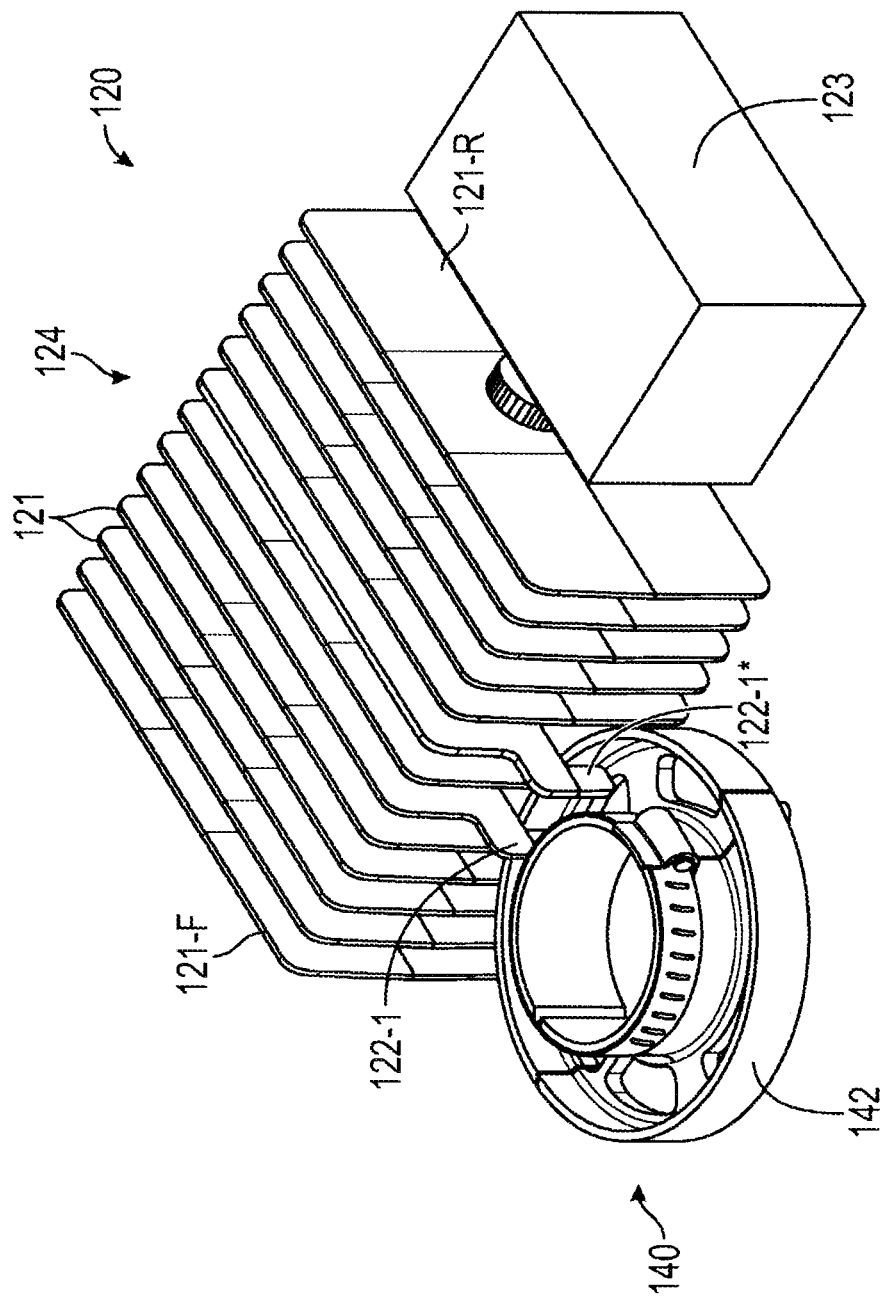
FIGS. 2A and 2B depict perspective views of a heater body including a heating fin assembly in accordance with disclosed teachings.
Figure 2B:
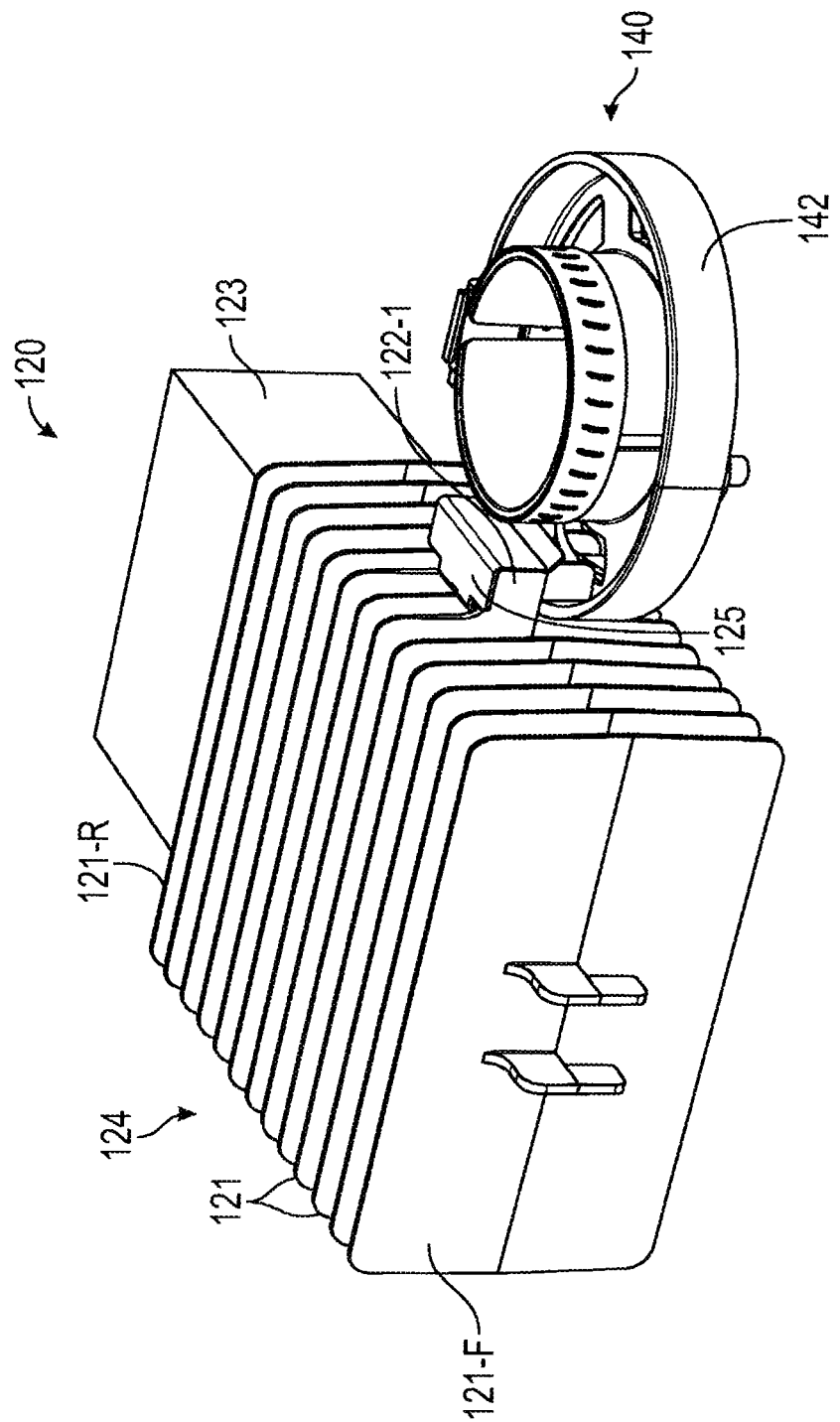

FIGS. 2A and 2B illustrate isolation views of a heater body [120] engaging a hanging bracket [140]. The heater body [120] illustrated in FIGS. 2A and 2B includes a junction box [123] coupled to a heat fin assembly [124] comprised of a plurality of heat fins [121] including a forward heat fin [121]-F furthest from junction box [123] and a rear heat fin [121-R] closest to junction box [123]. The heat fins [121] illustrated in FIGS. 2A and 2B comprise a plurality of rectangularly shaped plates positioned in parallel within one another. Each of the plates may be comprised of a thermally conductive material. Two of the plates illustrated in FIGS. 2A and 2B include a hooked projection [122-1, 122-1*], each of which is illustrated engaging a lipped wall provided as an engagement lip [142] that encircles the hanging bracket [140]. FIG. 2B includes the use of a clip [125] as a means of securing the hooked projections [122] ([122-1] shown) to the engagement lip [142] of the hanging bracket [140], while also providing a means of quickly un-securing the heater body [120] for removal from the instrument enclosure [150] (not shown).

Figure 3:
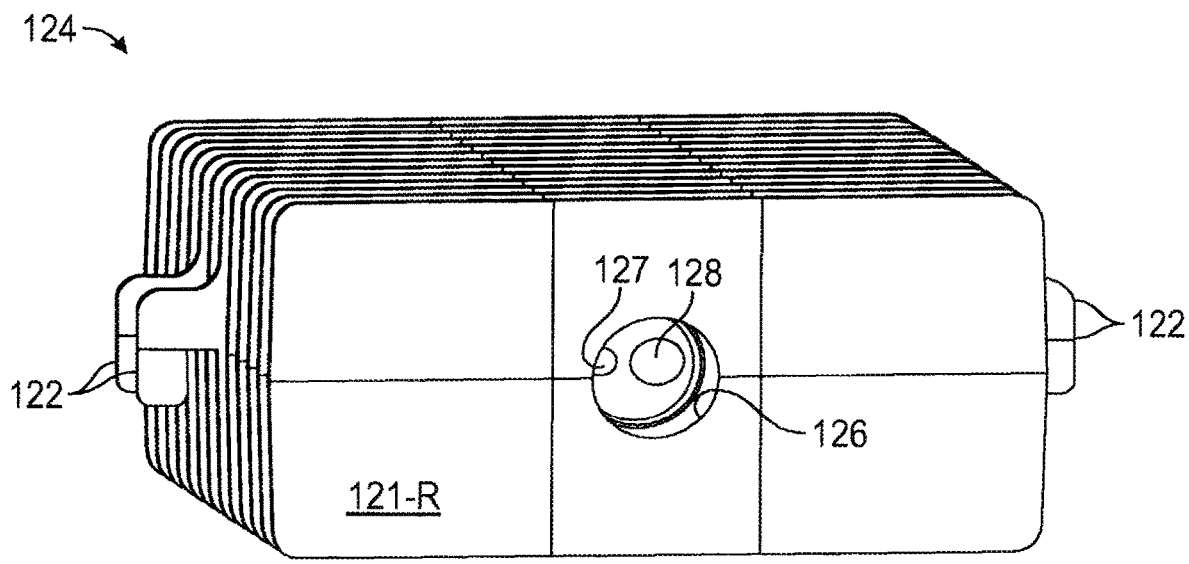
FIG. 3 illustrates a perspective view of the heating fin assembly.

FIG. 3 illustrates a perspective view of heat fin assembly [124] in isolation. The heat fin assembly [124] illustrated in FIG. 2 includes a pair of hooked projections [122] on each side of the assembly. One or more of the heat fins [124] may include a hole or opening into which a support rod (not depicted) might be inserted to support the heat fins [124]. As an example, the rear heat fin [121-R] illustrated in FIG. 3 includes such an opening, known as a heat fin aperture [126]. The heat fin aperture [126] provides access to a fuse aperture [127] and a threaded heater cartridge aperture [128] capable of receiving a heater cartridge (not shown).

Figure 4:
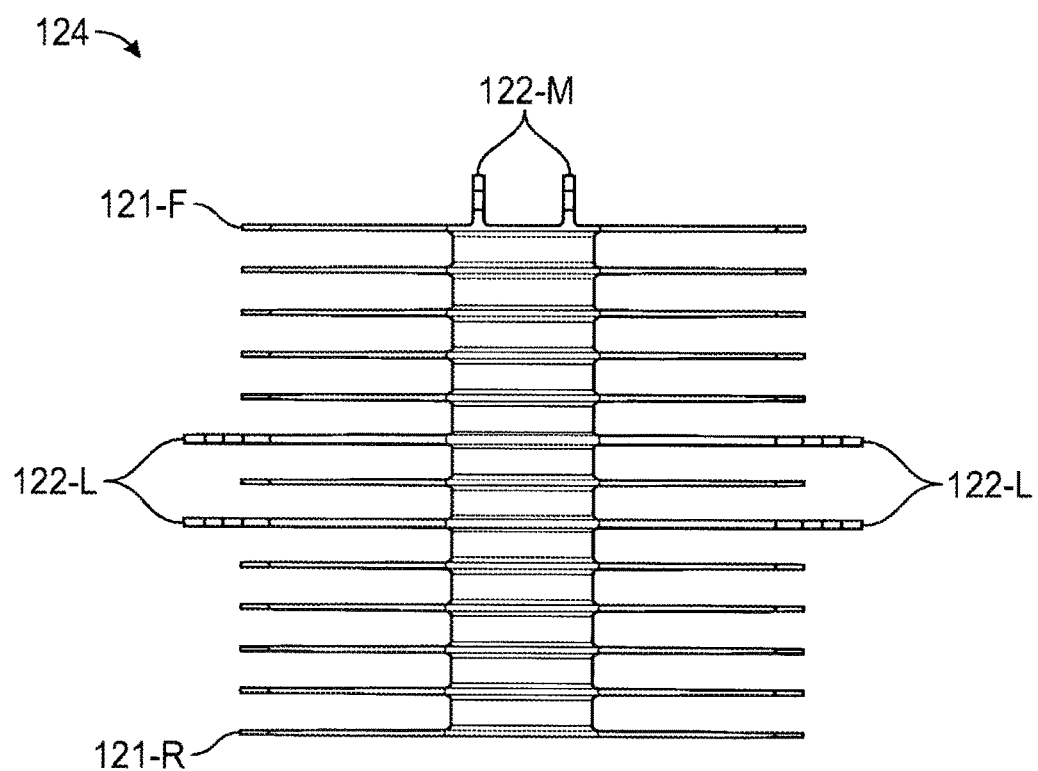
FIG. 4 illustrates a plan view of the heating fin assembly.

FIG. 4 illustrates a plan view of heat fin assembly [124]. The heat fin assembly [124] illustrated in FIG. 4 includes a pair of laterally oriented hooked projections [122-L] on each side of the heat fin assembly and a pair of medially-oriented hooked projections [122-M] formed on the forward heat fin [121-F]. This configuration of heat fins and hooked projections is exemplary and other embodiments may employ different configurations of heat fins and hooked projections.

Figure 5:
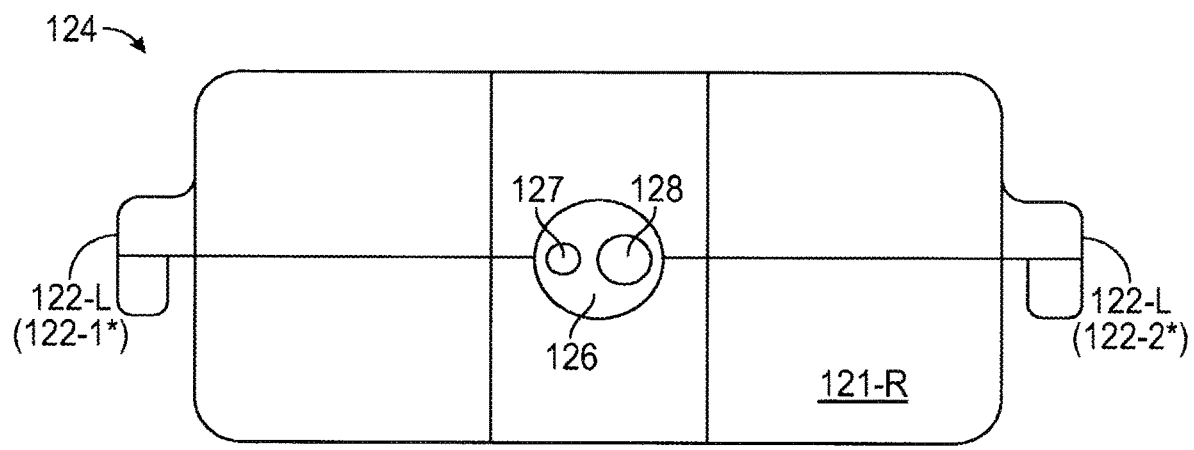
FIG. 5 illustrates a rear elevation view of the heating fin assembly.
Figure 6:
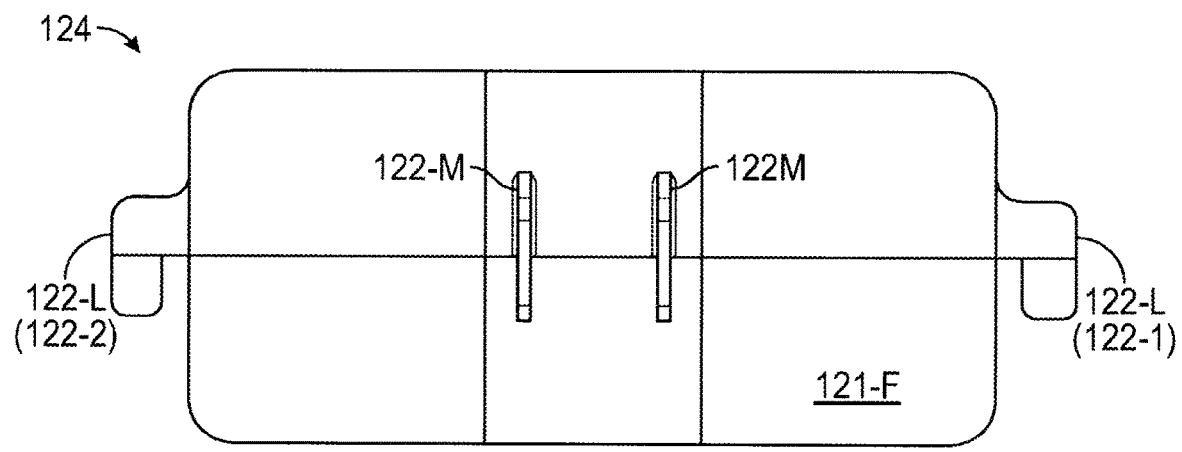
FIG. 6 illustrates a front elevation view of the heating fin assembly.

FIG. 5 illustrates an elevation view of heat fin assembly [124] in which the rear heat plate [121-R] is visible while FIG. 6 illustrates an elevation view of heat fin assembly [124] in which the forward heat fin [121-F] is visible. Laterally oriented hooked projections [122-L] are visible in both FIG. 5 and FIG. 6, with [122-1*] and [122-2*] specifically visible in FIG. 5 and [122-1] and [122-2] specifically visible in FIG. 6, while medially-oriented hooked projections [122-M] are visible on the forward heat fin [121-F] of FIG. 6. Other embodiments of heat fin assembly may include more or fewer hooked projections [122] and/or hooked projections located in different locations than those illustrated in FIG. 5. and FIG. 6. An additional view of the heat fin aperture [126] depicts the fuse aperture [127] as a smaller opening and the threaded heater cartridge aperture [128] capable of receiving a heater cartridge (not shown) as a larger opening. The apertures [126, 127, 128] can be tailored in size according to the dimensions of the required components utilizing the apertures.

Figure 7:
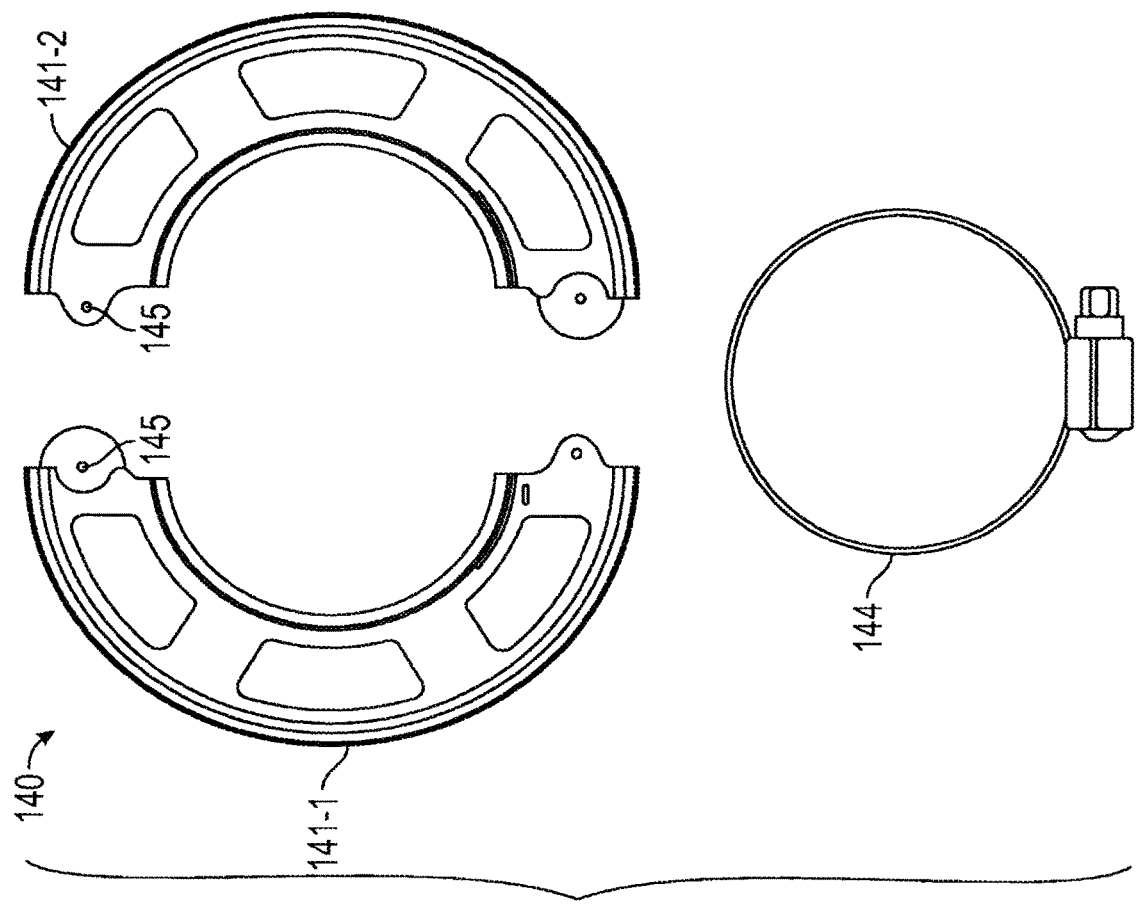
FIG. 7 illustrates a plan view of disassembled components of a hanging bracket assembly in accordance with disclosed teachings.

FIG. 7 illustrates an exemplary disassembled hanging bracket [140] including a pair of semicircular bracket components [141-1] and [141-2] and an adjustable hose clamp [144] that may be used to fasten bracket components [141-1] and [141-2] together. Fastener apertures [145] may be utilized as a singular or additional means of assembling the hanging bracket [140]. Bracket components [141] may be metallic, plastic, or another suitable material or combination of materials having suitable strength, durability, cost, and availability. The illustrated hanging bracket [140] is suitable for engaging a pipe stand with a circular cross section. The hanging bracket [140] may, however, be of a different shape to accommodate a square or rectangular pipe stand or a pipe with a different cross section shape.

Figure 8:
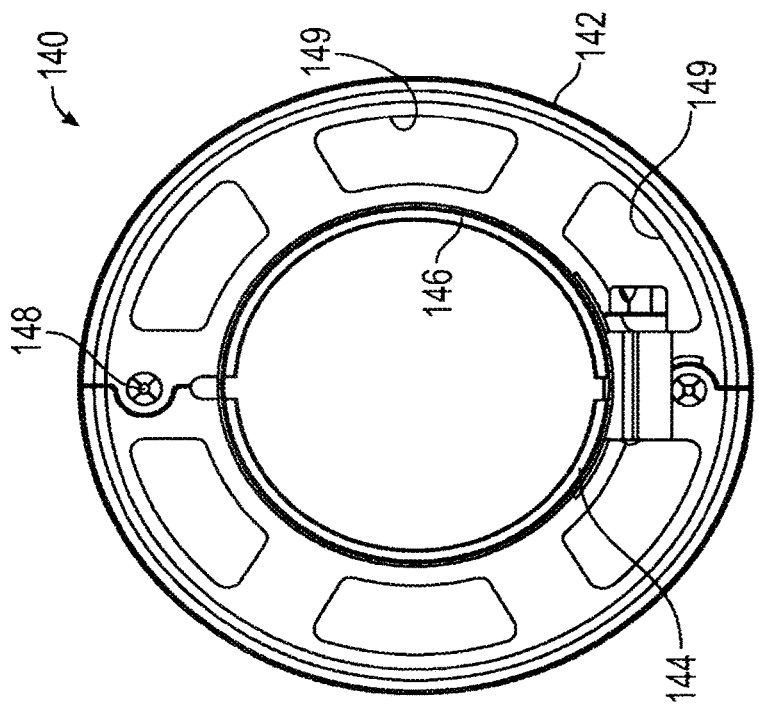
FIG. 8 illustrates a plan view of the hanging bracket assembly after assembly.

FIG. 8 illustrates an exemplary fully-assembled hanging bracket [140]. The assembled hanging bracket [140] illustrated in FIG. 8 includes a hub wall [146], a hanging bracket [140] surrounding hub wall [146], and the engagement lip [142], encircling the hanging bracket [140], on which suitable hooked projections may engage as discussed in the preceding description. The illustrated hanging bracket [140] includes a plurality of bracket openings [149], but other embodiments may omit bracket openings [149], or include more or fewer bracket openings [149] and/or employ openings of a different shape. Fasteners [148] may be used as a means of securing the bracket components [141] to form the hanging bracket which is in the form of a plate [140].

Figure 9:
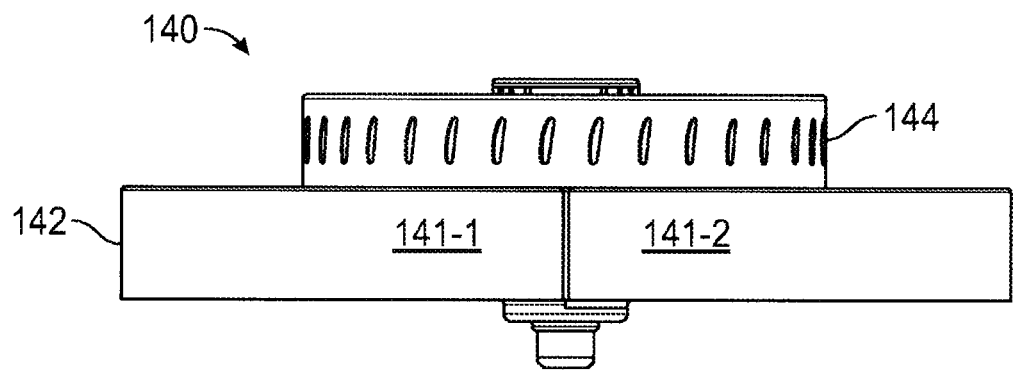
FIG. 9 illustrates a side elevation view of the hanging bracket assembly.

FIG. 9 illustrates a side elevation view of the assembled hanging bracket [140] including the engagement lip [142] encircling the hanging bracket [140] and the adjustable hose clamp [144] fastening the pair of semicircular bracket components [141-1, 141-2] together.

Figure 10A:
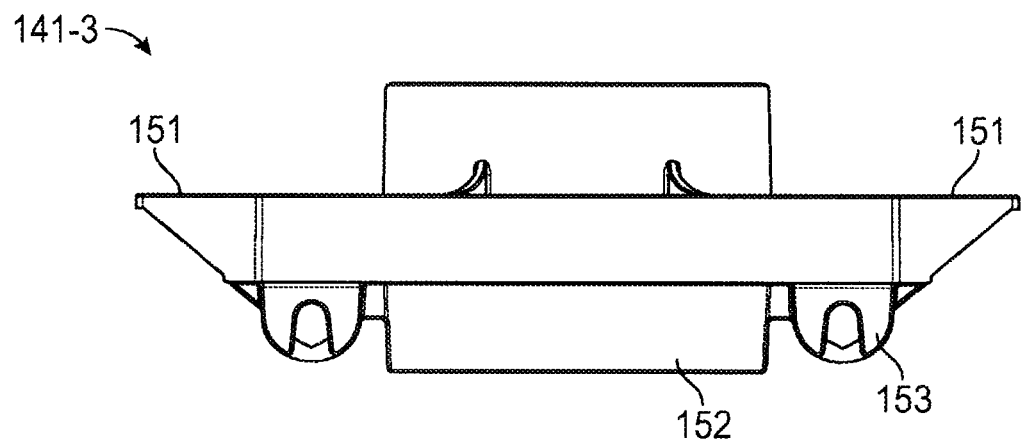
FIG. 10A illustrates a side elevation view of an additional embodiment of a component of the hanging bracket assembly.
Figure 10B:
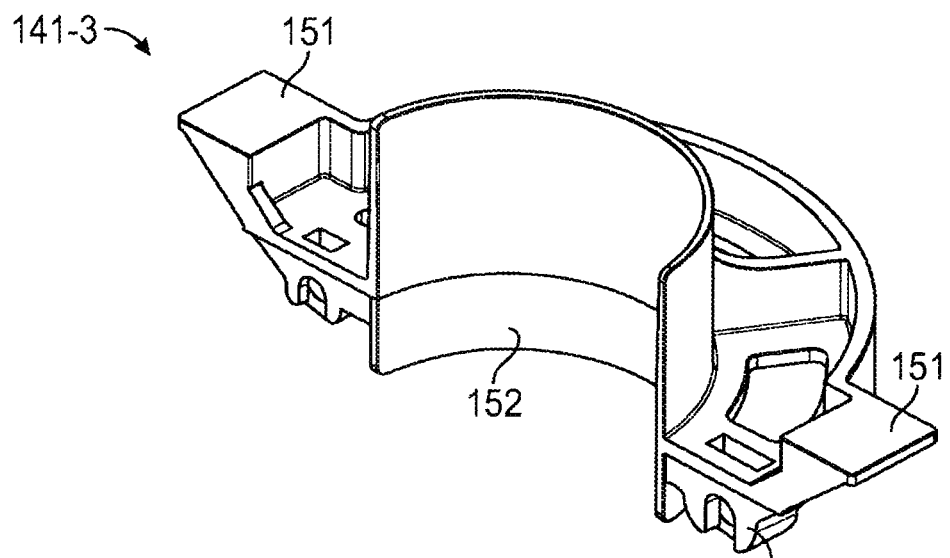
FIG. 10B illustrates a perspective view of an additional embodiment of a component of the hanging bracket assembly.

FIG. 10A depicts an external elevation view of an additional embodiment of a disassembled bracket component [141-3], while FIG. 10B depicts an internal perspective view of a disassembled bracket component [141-3]. The additional embodiment of the hanging bracket [140] provides added [151] for vertical mounting of the heater body, additional lower rib [152], and alternative fastening configurations [153] for assembly of the components.

Figure 11A:
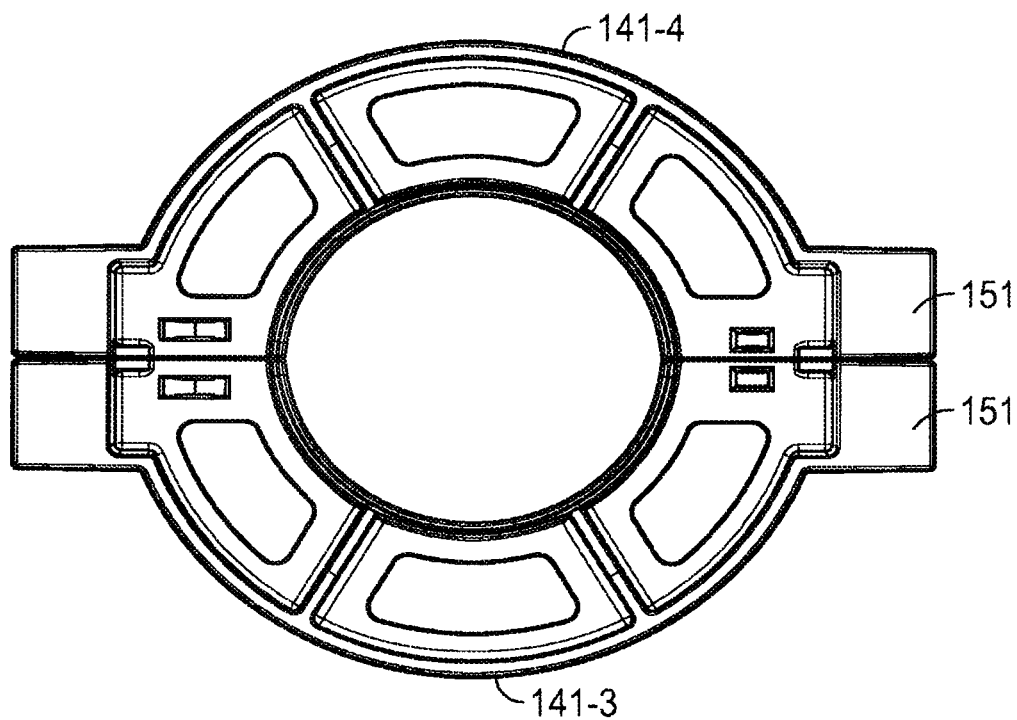
FIG. 11A illustrates a plan view of an additional embodiment of assembled components of a hanging bracket assembly in accordance with disclosed teachings.
Figure 11B:
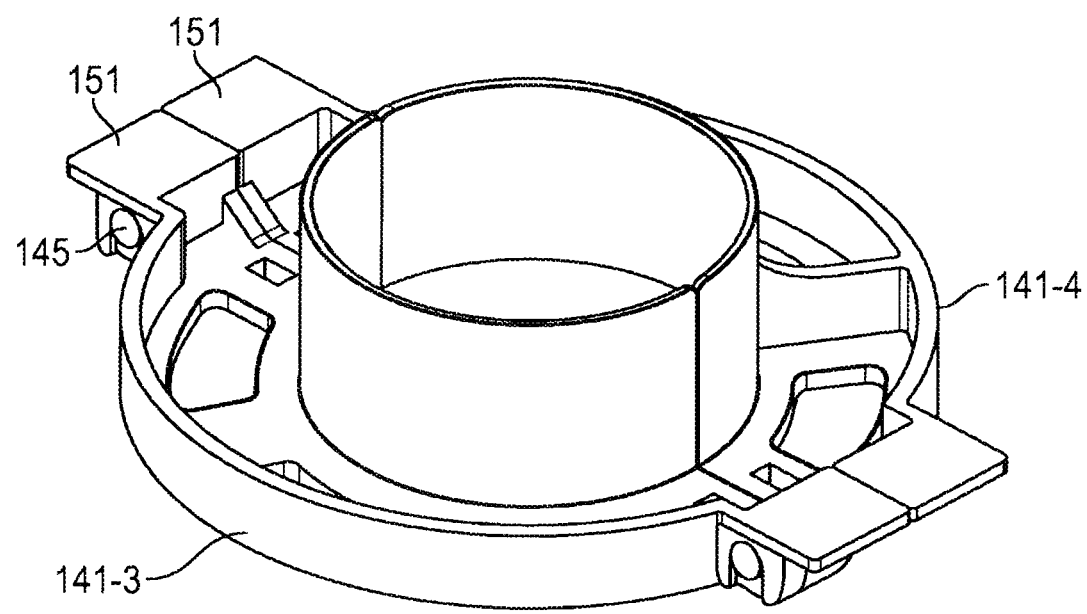
FIG. 11B illustrates a perspective view of an additional embodiment of assembled components of a hanging bracket assembly in accordance with disclosed teachings.

FIGS. 11A and 11B provide the additional embodiment of the hanging bracket [140] as an assembled pair of semicircular bracket components [141-3, 141-4] having added wings [151] and alternate configuration of the fastener apertures [145] capable of receiving a fastener [148].

Figure 13:
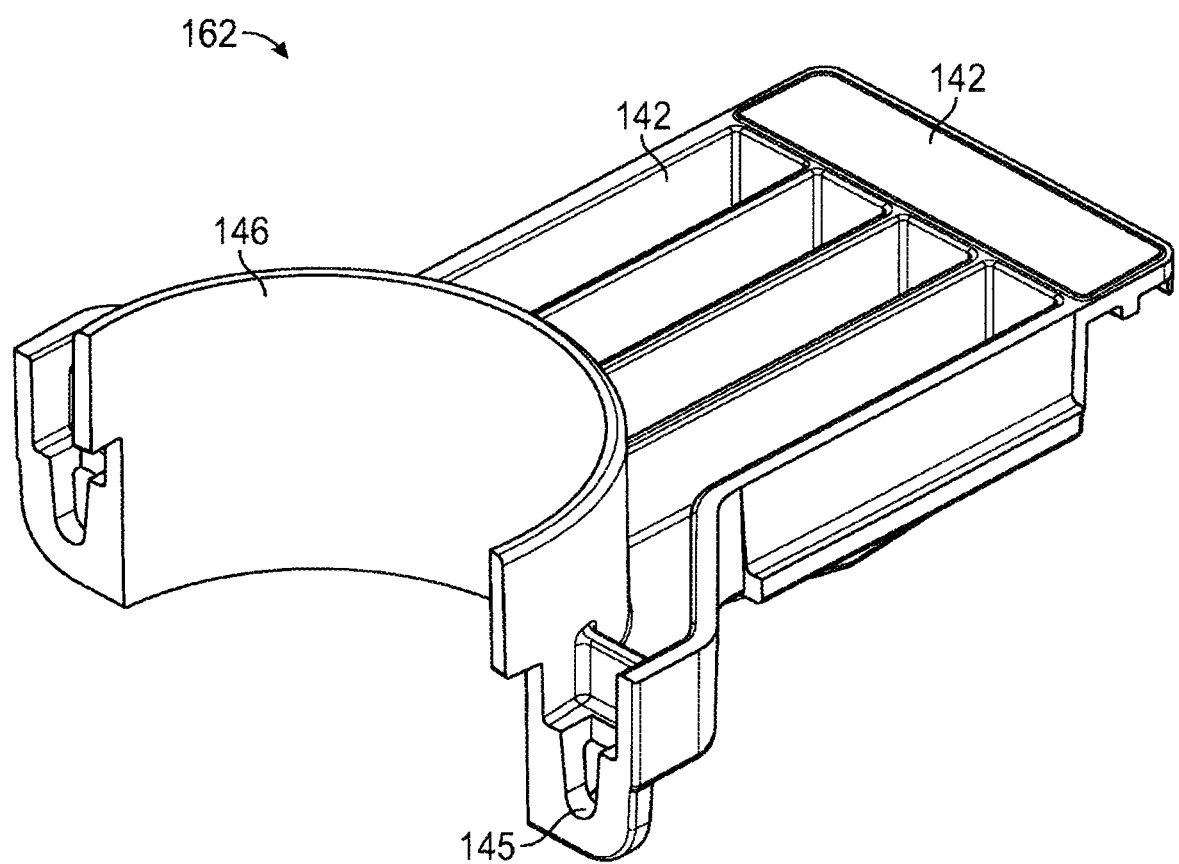
FIG. 13 illustrates an additional perspective view of a portion of a rectangular embodiment of a hanging bracket.

FIGS. 12A and 12B illustrate a rectangular hanging bracket [160], having a long component [161] and a short component [162] capable of being secured together using fasteners [148] through fastener apertures [146]. Similar to the hanging bracket [140], the rectangular hanging bracket [160] has a hub wall [146] and engagement lip [142]. FIG. 12B illustrates a perspective view of an assembled rectangular hanging bracket [160] having a hub wall [146] and engagement lip [142]. FIG. 13 illustrates an additional perspective view the short component [162] of a rectangular hanging bracket [160] showing fastener apertures [145], hub wall [146] and engagement lip [142].

Figure 15A:
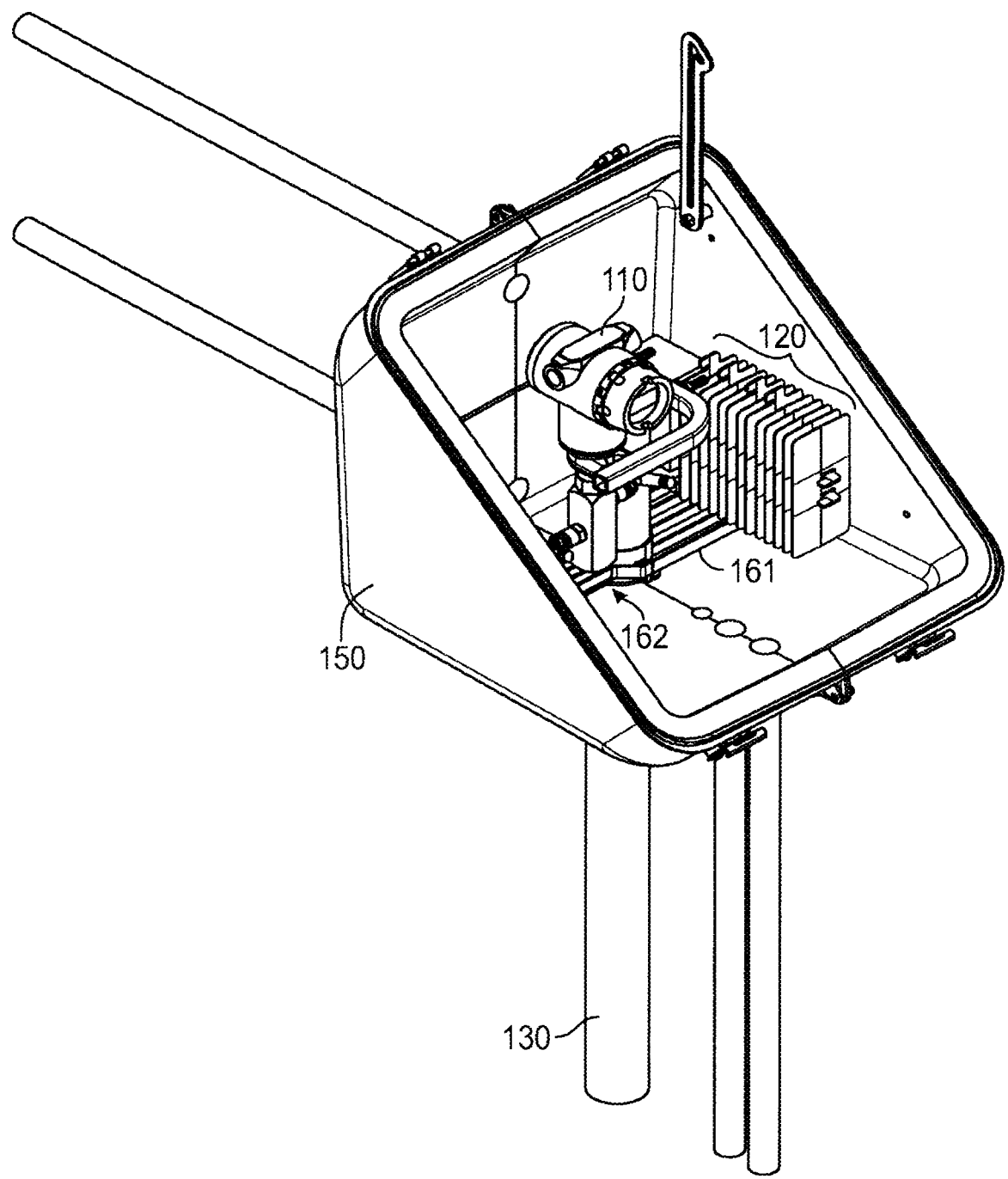
FIG. 15A illustrates a perspective view of an installed heater body in a "not close" configuration within the instrument enclosure.
Figure 15B:
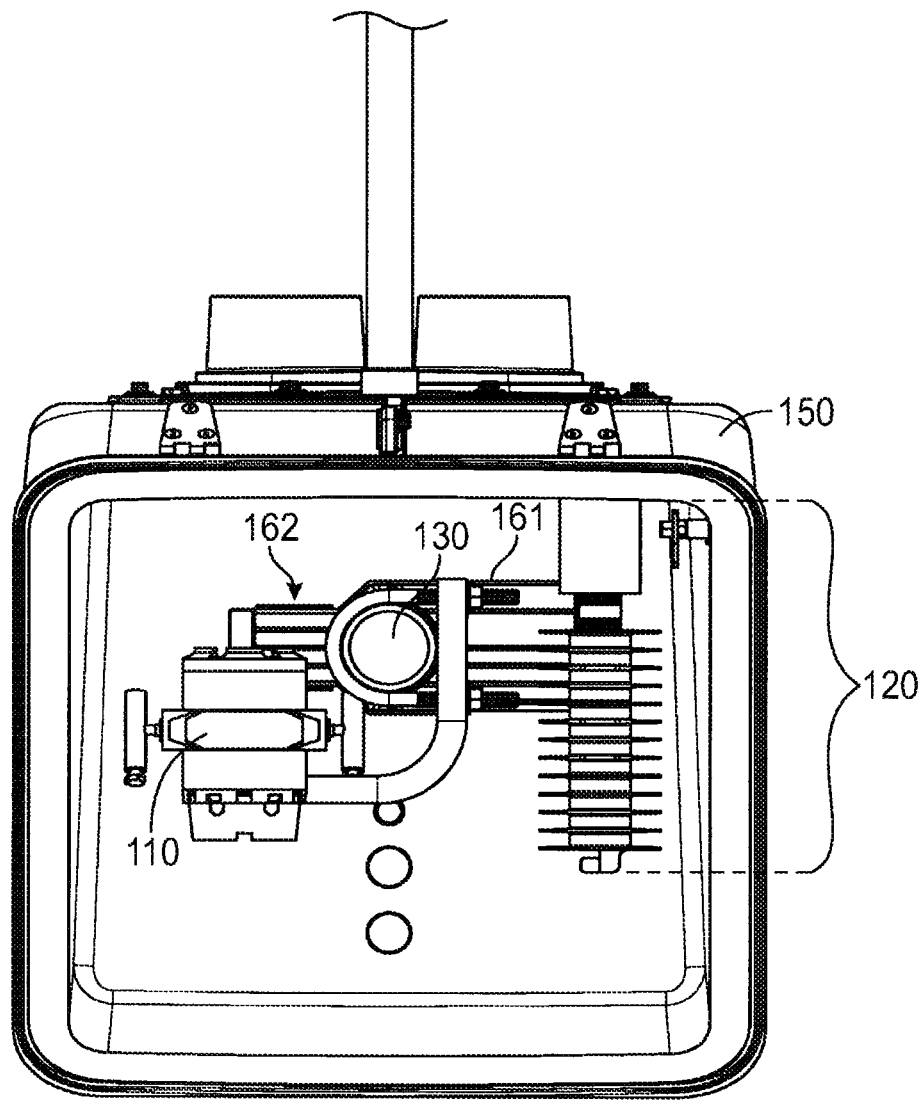
FIG. 15B illustrates a plan view of an installed heater body in a "not close" configuration within the instrument enclosure.

FIGS. 14A, 14B, and 14C depict positioning of the heater body [120] in relation to the instrument [110]. The rectangular hanging bracket [160] in FIG. 14A is attached to the pole stand [130] with the short component [162] positioned under the instrument [110], and the long component [161] on the opposite side of the pole stand [130] from the instrument [110], therefore placing the heater body [120] in a "NOT CLOSE" position relative to the instrument [110]. FIG. 15A illustrates a perspective view of an installed rectangular hanging bracket [160] supporting a heater body [120] in a "not close" configuration within the instrument enclosure [150]. FIG. 15B illustrates a plan view of an installed rectangular hanging bracket [160] supporting a heater body [120] in a "not close" configuration within the instrument enclosure [150].

Figure 16A:
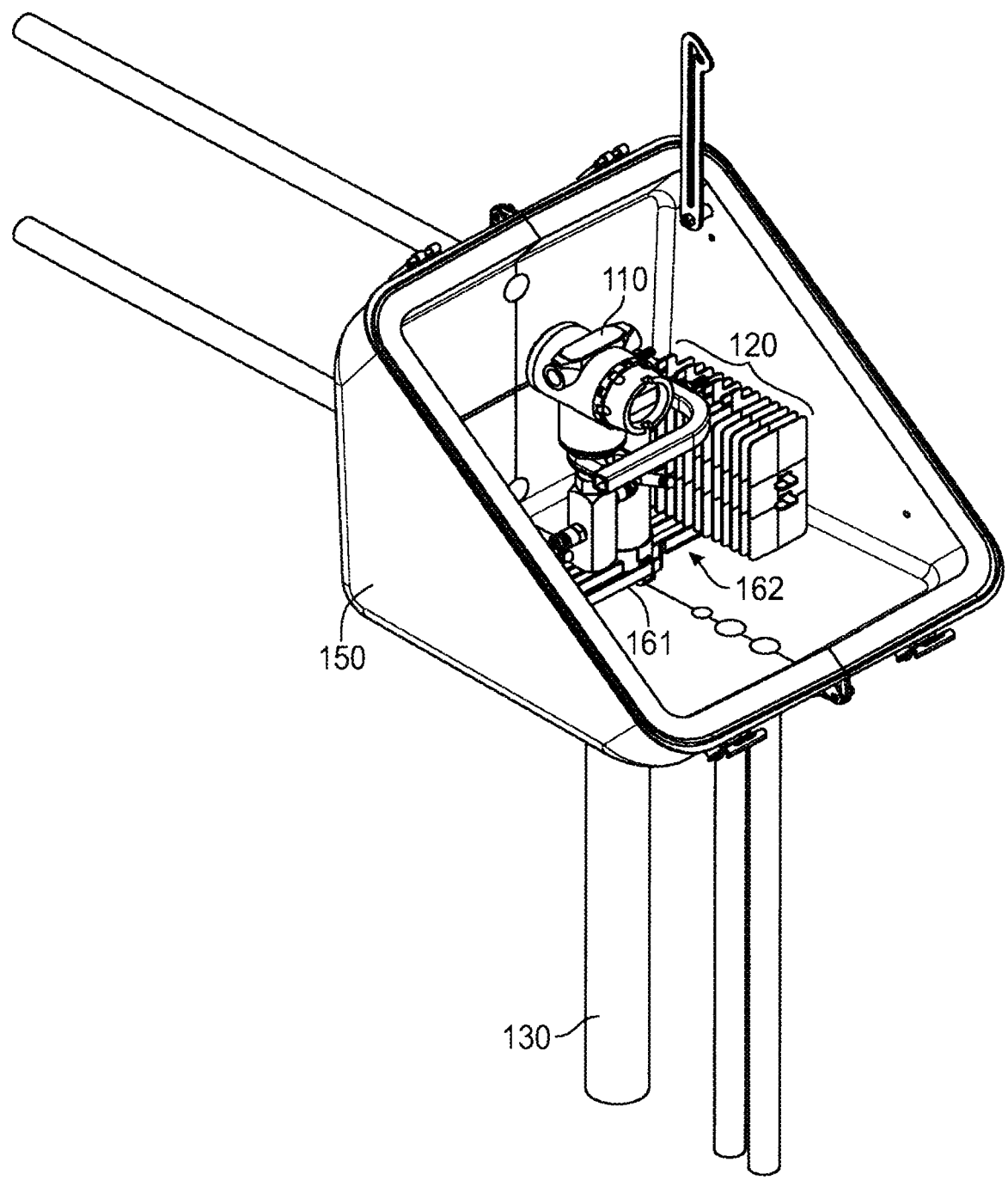
FIG. 16A illustrates a perspective view of an installed heater body in a "close" configuration within the instrument enclosure.
Figure 16B:
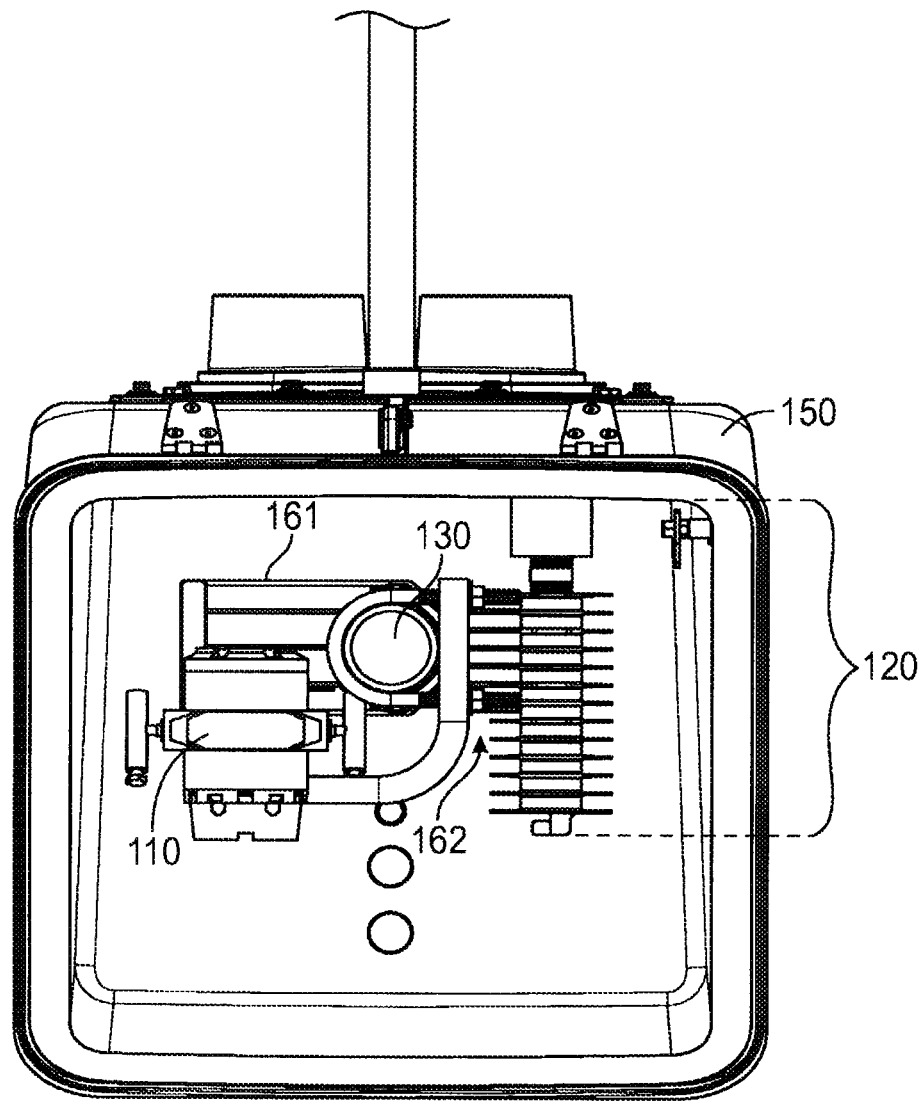
FIG. 16B illustrates a plan view of an installed heater body in a "close" configuration within the instrument enclosure.

The rectangular hanging bracket [160] in FIG. 14 is attached to the pole stand [130] with the long component [161] positioned under the instrument [110], and the short component [162] on the opposite side of the pole stand [130] from the instrument [110], therefore placing the heater body [120] in a "CLOSE" position relative to the instrument [110]. FIG. 16A illustrates a perspective view of an installed rectangular hanging bracket [160] supporting a heater body [120] in a "close" configuration within the instrument enclosure [150]. FIG. 16B illustrates a plan view of an installed rectangular hanging bracket [160] supporting a heater body [120] in a "close" configuration within the instrument enclosure [150].

Figure 17A:
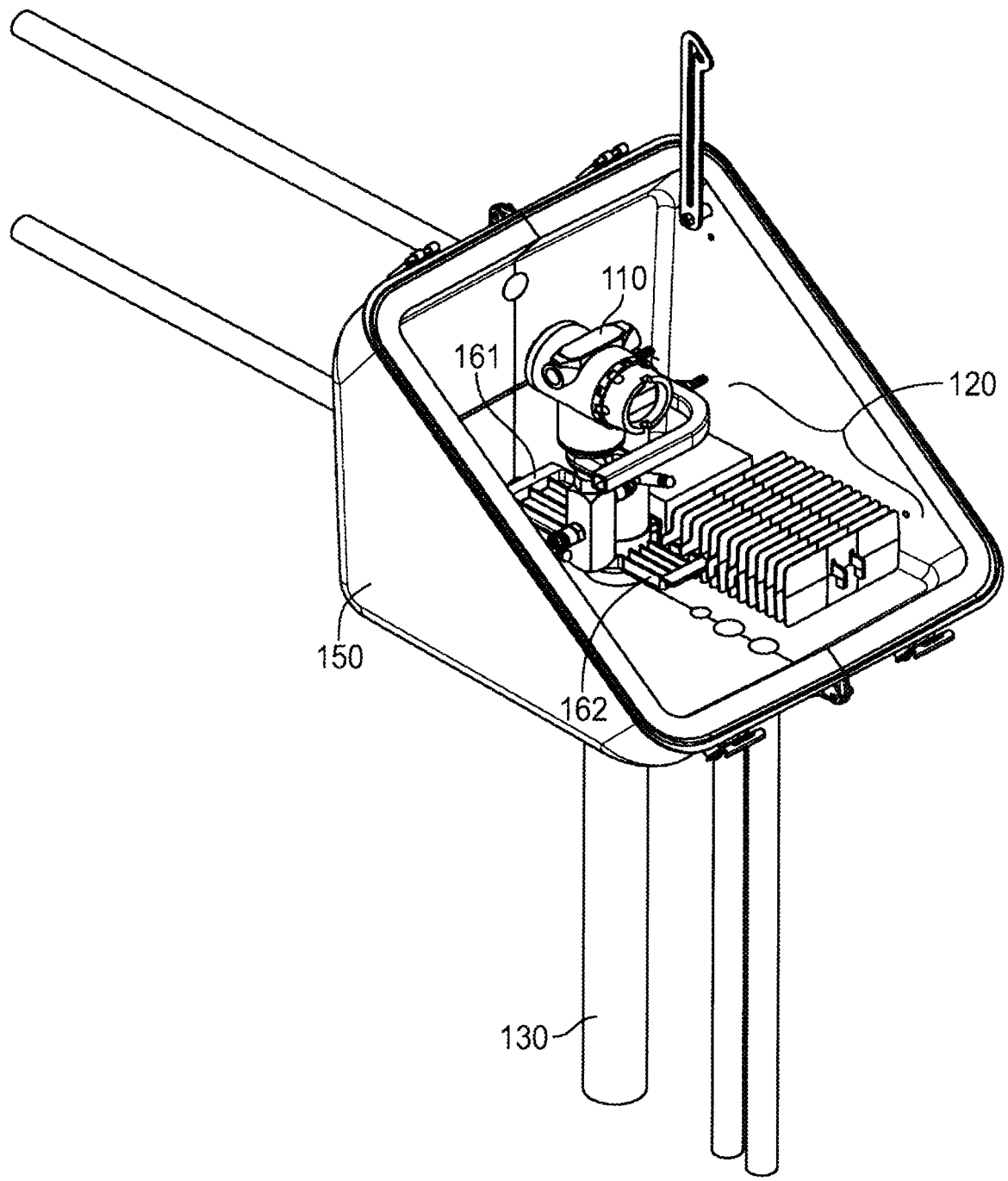
FIG. 17A illustrates a perspective view of an installed heater body in a "horizontal" configuration within the instrument enclosure; and, FIG. 17B illustrates a plan view of an installed heater body in a "horizontal" configuration within the instrument enclosure.
Figure 17B:
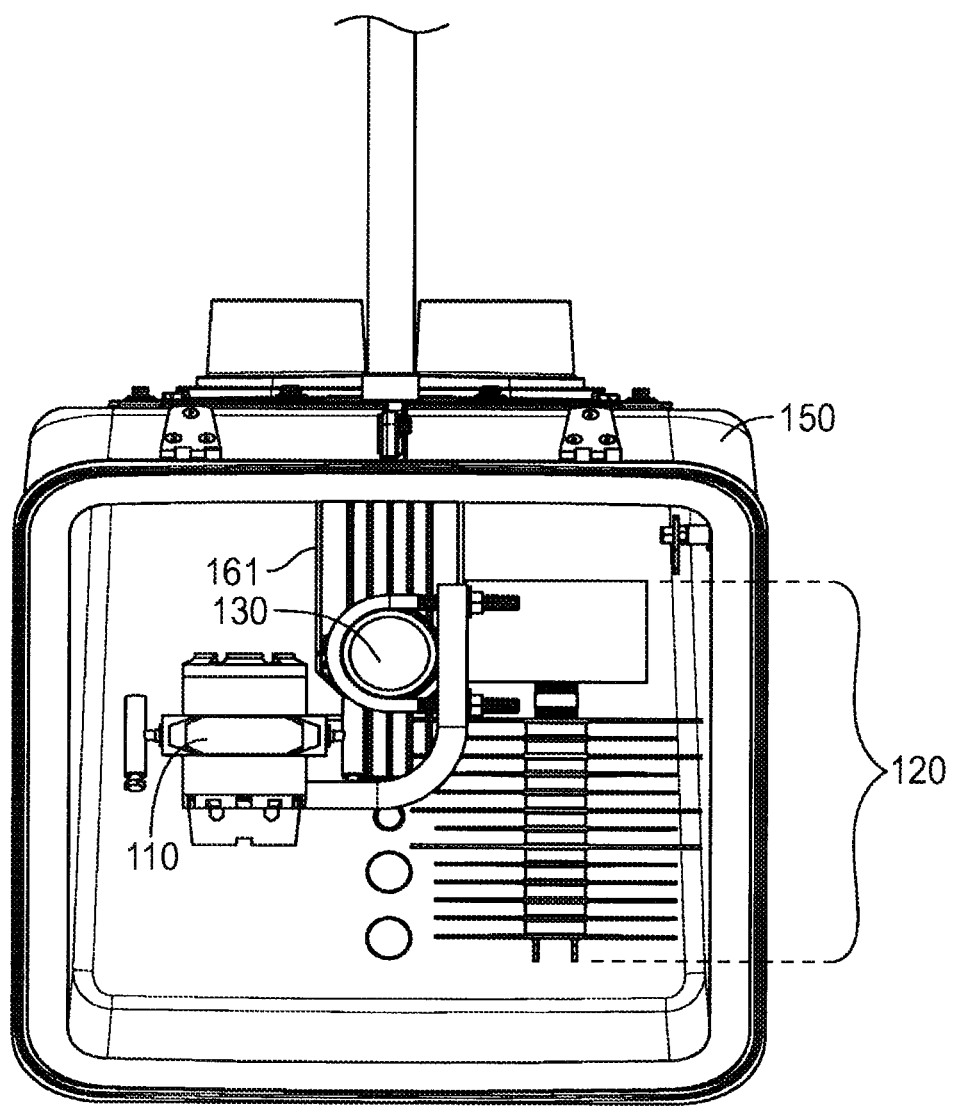

The rectangular hanging bracket [160] in FIG. 14C is attached to the pole stand [130] with the short component [162] and long component [161] positioned parallel to the instrument [110], with the short component [162] on the front side of the pole stand [130] in relation to the instrument [110], therefore allowing the heater body [120] to be positioned in a "HORIZONTAL" orientation relative to the instrument [110]. FIG. 17A illustrates a perspective view of an installed rectangular hanging bracket [160] supporting a heater body [120] in a "horizontal" configuration within the instrument enclosure [150]. FIG. 17B illustrates a plan view of an installed rectangular hanging bracket [160] supporting a heater body [120] in a "horizontal" configuration within the instrument enclosure [150].

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

We claim:

1. An adjustable assembly comprising; at least one enclosure portion that provides an internal or external housing of one or more instruments and one or more heater elements that are enclosed by at least one main heater body assembly surrounded by and attached to heat transfer fins to provide a finned heater body wherein said main heater body assembly includes at least one or more hooked projections wherein said hooked projections are shaped in an inverted L-shaped arrangement and wherein said hooked projections are attached to at least one lateral or at least one medial or both lateral and medial sides of a center portion of said main heater body assembly and wherein said finned heater body includes one or more positional openings that allow for containment of said heater element and concurrently provide a spatial geometric arrangement so that said one or more hooked projections provide an ability for said finned heater body and said internal or external housing of one or more instruments to be hung in adjustable manner from a mounting bracket that is attached to a post or pipe stand.

2. The adjustable assembly of claim 1, wherein said mounting bracket attached to said post or pipe stand comprises two semi-circumferential left and right mounting bracket sections that can be mated, wherein each section is contoured to fit around said pipe stand and is secured tightly to said pipe stand.

3. The adjustable assembly of claim 1, wherein said pipe stand is provided with an adjustable or non-adjustable pipe stand clamp so that said enclosure assembly and said mounting bracket can be located at an optimal location and/or height along a length of said pipe stand.

4. The adjustable assembly of claim 1, wherein said finned heater body is an assembly that also includes hooked projections that extend from a center portion of said finned heater body to provide an ability for said finned heater body to be hung from said mounting bracket by utilization of inverted L-shaped hooked projections.

5. The adjustable assembly of claim 1, wherein said two semi-circumferential mounting bracket sections provides a U-shaped body that is contoured in order to provide a geometric fit and attachment to said pipe stand.

6. The adjustable assembly of claim 1, wherein said two semi-circumferential mounting bracket sections are secured to said pipe stand with a tensioning fastener that allows for adjustable pinning and tightening of said two mated semi-circumferential mounting brackets to said pipe stand.

7. The adjustable assembly of claim 5, wherein an engagement lip is created that surrounds said U-shaped body so that said finned heater body can be hung anywhere along a 360-degree perimeter of said engagement lip and wherein said engagement lip is completed after said two mated semi-circumferential mounting bracket sections are mated.

8. The adjustable assembly of claim 7, wherein said two semi-circumferential mounting bracket sections with said U-shaped body have an inner contour portion on each of two semi-circumferential halves and an outer contour portion located on an outside portion of said U-shaped body, wherein said outer contour portion is located in a position further way from said pipe stand such that an offset from said inner contour portion of said two mated semi-circumferential mounting bracket sections creates at least a portion of said engagement lip to enable said engagement lip to complete a 360-degree circumference around two semi-circumferential mounting bracket sections.

9. The adjustable assembly of claim 1, wherein one or more instruments are also mounted by an attachment to two circumferential instrument mounting brackets with two halves that are shaped with a contour so that said that two circumferential instrument mounting brackets can be mated and attached to said pipe stand via a tensioning fastener.

10. The adjustable assembly of claim 1, wherein both said one or more instruments and said one or more heater elements are mounted either within or external to one or more enclosure portions and wherein one or more heater elements are enclosed by at least one main heater body assembly surrounded by and attached to heat transfer fins to provide a finned heater body and wherein two or more mounting brackets secure both said one or more instruments and one or more heater body assemblies to said pipe stand and wherein attachment to an existing mounting can either be added or removed without dismantling other portions of said field mountable instrument heater.

11. The adjustable assembly of claim 1, wherein at least two semi-circumferential left and right mounting bracket sections that can be mated can also be rectangular or in another shape configured to secure said one or more instruments and one or more heater elements to said pipe stand.

12. The adjustable assembly of claim 9, wherein said tensioning fasteners are selected from at least one of a group consisting of clamps, braces, grips, vices, clips, screws, and bolts.

13. A field mountable instrument heater comprising; at least three components that fit together in at least one adjustable configuration, wherein said at least three components include two components that are adjustable to accommodate and attach to a pipe stand or mounting post and wherein a third component is a housing that accommodates both internal and external mounting of one or more heater elements, wherein said heater elements are enclosed and surrounded in a finned heater body assembly and wherein said at least two components that are adjustable to accommodate and attach to said pipe stand are connected to each other and form an engagement lip portion around a perimeter of two connected components so that a third component can be fastened to at least said engagement lip portion and can be removably connected to at least two components connected to each other and wherein attachment to an existing mounting can either be added or removed without dismantling other portions of said field mountable instrument heater.

14. A method for installing and using an adjustable assembly comprising; at least one enclosure portion that provides an internal or external housing of one or more instruments and one or more heater elements that are enclosed by at least one main heater body assembly surrounded by and attached to heat transfer fins to provide a finned heater body wherein said main heater body assembly includes at least one or more hooked projections wherein said hooked projections are shaped in an inverted L-shaped arrangement and wherein said hooked projections are attached to at least one lateral or at least one medial or both lateral and medial sides of a center portion of said main heater body assembly and wherein said finned heater body includes one or more positional openings that allow for containment of said heater element and concurrently provide a spatial geometric arrangement so that said one or more hooked projections provide an ability for said finned heater body and said internal or external housing of one or more instruments to be hung in adjustable manner from a mounting bracket that is attached to a post or pipe stand, wherein said method allows for removing, adding, installing, and using instruments in a controlled and regulated either heated or unheated environment without requiring any disassembly and/or reassembly of any items along said pole stand.

15. The method of claim 14, wherein said mounting bracket attached to said post or pipe stand comprises two semi-circumferential left and right mounting bracket sections that can be mated, wherein each section is contoured to fit around said pipe stand and is secured tightly to said pipe stand.

16. The method of claim 14, wherein said pipe stand is provided with an adjustable or non-adjustable pipe stand clamp so that said enclosure assembly and said mounting bracket can be located at an optimal location and/or height along a length of said pipe stand.

17. The method of claim 14, wherein said finned heater body is an assembly that also includes hooked projections that extend from a center portion of said finned heater body to provide an ability for said finned heater body to be hung from said mounting bracket by utilization of inverted L-shaped hooked projections.

18. The method of claim 14, wherein said two semi-circumferential mounting bracket sections provides a U-shaped body that is contoured in order to provide a geometric fit and attachment to said pipe stand.

19. The method of claim 14, wherein said two semi-circumferential mounting bracket sections are secured to said pipe stand with a tensioning fastener that allows for adjustable pinning and tightening of said two mated semi-circumferential mounting brackets to said pipe stand.

20. The method of claim 14, wherein an engagement lip is created that surrounds said U-shaped body so that said finned heater body can be hung anywhere along a 360-degree perimeter of said engagement lip and wherein said engagement lip is completed after said two mated semi-circumferential mounting bracket sections are mated.

21. The method of claim 14, wherein said two semi-circumferential mounting bracket sections with said U-shaped body have an inner contour portion on each of two semi-circumferential halves and an outer contour portion located on an outside portion of said U-shaped body, wherein said outer contour portion is located in a position further way from said pipe stand such that an offset from said inner contour portion of said two mated semi-circumferential mounting bracket sections creates at least a portion of said engagement lip to enable said engagement lip to complete a 360-degree circumference around two semi-circumferential mounting bracket sections.

22. The method of claim 14, wherein one or more instruments are also mounted by an attachment to two circumferential instrument mounting brackets with two halves that are shaped with a contour so that said that two circumferential instrument mounting brackets can be mated and attached to said pipe stand via a tensioning fastener.

23. The method of claim 14, wherein both said one or more instruments and said one or more heater elements are mounted either within or external to one or more enclosure portions and wherein one or more heater elements are enclosed by at least one main heater body assembly surrounded by and attached to heat transfer fins to provide a finned heater body and wherein two or more mounting brackets secure both said one or more instruments and one or more heater body assemblies to said pipe stand.

24. The method of claim 14, wherein at least two semi-circumferential left and right mounting bracket sections that can be mated can also be rectangular or in another shape configured to secure said one or more instruments and one or more heater elements to said pipe stand.

25. The method of claim 14, wherein said tensioning fasteners are selected from at least one of a group consisting of clamps, braces, grips, vices, clips, screws and bolts.

\* \* \* \* \*